United States Patent
Chamberlin et al.

(10) Patent No.: US 8,659,191 B2
(45) Date of Patent: Feb. 25, 2014

(54) SLEEVE MEMBER FOR AN ELECTRIC MACHINE

(75) Inventors: Bradley D. Chamberlin, Pendleton, IN (US); James Ramey, Fortville, IN (US)

(73) Assignee: Remy Technologies, LLC, Pendleton, IN (US)

( * ) Notice: Subject to any disclaimer, the term of this patent is extended or adjusted under 35 U.S.C. 154(b) by 293 days.

(21) Appl. No.: 13/110,772

(22) Filed: May 18, 2011

(65) Prior Publication Data

US 2011/0285222 A1    Nov. 24, 2011

Related U.S. Application Data

(60) Provisional application No. 61/345,946, filed on May 18, 2010.

(51) Int. Cl.
*H02K 9/00* (2006.01)
*H02K 9/20* (2006.01)
*H02K 9/19* (2006.01)

(52) U.S. Cl.
CPC ..................... *H02K 9/19* (2013.01)
USPC ................. 310/54; 310/52; 310/58

(58) Field of Classification Search
CPC ........................................ H02K 9/19
USPC ............................... 310/52, 54, 58
IPC ............................... H02K 9/00, 9/20
See application file for complete search history.

(56) References Cited

U.S. PATENT DOCUMENTS

| | | | | |
|---|---|---|---|---|
| 3,060,335 A | * | 10/1962 | Greenwald | 310/54 |
| 3,882,334 A | * | 5/1975 | Newill | 310/59 |
| 4,647,805 A | * | 3/1987 | Flygare et al. | 310/61 |
| 4,825,531 A | * | 5/1989 | Nold | 29/596 |
| 5,081,382 A | | 1/1992 | Collings et al. | |
| 5,180,004 A | | 1/1993 | Nguyen | |
| 5,207,121 A | | 5/1993 | Blen | |
| 5,372,213 A | | 12/1994 | Hasebe et al. | |
| 5,616,973 A | * | 4/1997 | Khazanov et al. | 310/54 |
| 5,798,593 A | * | 8/1998 | Salter et al. | 310/166 |
| 5,856,716 A | * | 1/1999 | Coupart et al. | 310/54 |
| 5,965,965 A | | 10/1999 | Umeda et al. | |
| 6,011,332 A | | 1/2000 | Umeda et al. | |
| 6,069,424 A | | 5/2000 | Colello et al. | |
| 6,087,744 A | * | 7/2000 | Glauning | 310/58 |
| 6,097,130 A | | 8/2000 | Umeda et al. | |
| 6,147,430 A | | 11/2000 | Kusase et al. | |
| 6,147,432 A | | 11/2000 | Kusase et al. | |
| 6,173,758 B1 | | 1/2001 | Ward et al. | |
| 6,181,043 B1 | | 1/2001 | Kusase et al. | |

(Continued)

OTHER PUBLICATIONS

International Search Report, Received Feb. 16, 2012.

*Primary Examiner* — John K Kim

(74) *Attorney, Agent, or Firm* — Cantor Colburn LLP

(57) ABSTRACT

Embodiments of the invention provide an electric machine module including a module housing. The module housing can include a sleeve member coupled to at least one end cover and can define a machine cavity. In some embodiments, the sleeve member can include an inner perimeter and can be coupled to a stator assembly of an electric machine. In some embodiments, the electric machine can be positioned within the machine and at least partially enclosed by the module housing. In some embodiments, a coolant jacket can be defined by at least a portion of the sleeve member and at least a portion of the stator assembly.

9 Claims, 3 Drawing Sheets

(56) References Cited

U.S. PATENT DOCUMENTS

| | | |
|---|---|---|
| 6,208,060 B1 | 3/2001 | Kusase et al. |
| 6,232,687 B1 | 5/2001 | Hollenbeck et al. |
| 6,242,836 B1 | 6/2001 | Ishida et al. |
| 6,291,918 B1 | 9/2001 | Umeda et al. |
| 6,313,559 B1 | 11/2001 | Kusase et al. |
| 6,333,573 B1 | 12/2001 | Nakamura |
| 6,335,583 B1 | 1/2002 | Kusase et al. |
| 6,346,758 B1 | 2/2002 | Nakamura |
| 6,404,628 B1 | 6/2002 | Nagashima et al. |
| 6,417,592 B2 | 7/2002 | Nakamura et al. |
| 6,459,177 B1 | 10/2002 | Nakamura et al. |
| 6,515,392 B2 | 2/2003 | Ooiwa |
| 6,522,043 B2 | 2/2003 | Measegi |
| 6,559,572 B2 | 5/2003 | Nakamura |
| 6,579,202 B2 | 6/2003 | El-Antably et al. |
| 6,617,715 B1 | 9/2003 | Harris et al. |
| 6,770,999 B2 | 8/2004 | Sakurai |
| 6,897,594 B2 | 5/2005 | Ichikawa et al. |
| 6,998,749 B2 | 2/2006 | Wada et al. |
| 7,002,267 B2 * | 2/2006 | Raszkowski et al. ........... 310/54 |
| 7,239,055 B2 | 7/2007 | Burgman et al. |
| 7,276,006 B2 | 10/2007 | Reed et al. |
| 7,284,313 B2 | 10/2007 | Raszkowski et al. |
| 7,339,300 B2 | 3/2008 | Burgman et al. |
| 7,352,091 B2 | 4/2008 | Bradfield |
| 7,417,344 B2 | 8/2008 | Bradfield |
| 7,508,100 B2 | 3/2009 | Foster |
| 7,508,101 B2 * | 3/2009 | Kaminski et al. ............... 310/54 |
| 7,538,457 B2 | 5/2009 | Holmes et al. |
| 7,545,060 B2 | 6/2009 | Ward |
| 7,615,903 B2 | 11/2009 | Holmes et al. |
| 7,615,951 B2 | 11/2009 | Son et al. |
| 7,667,359 B2 | 2/2010 | Lee et al. |
| 2003/0193260 A1 | 10/2003 | Reiter, Jr. et al. |
| 2004/0036367 A1 | 2/2004 | Denton et al. |
| 2004/0195929 A1 | 10/2004 | Oshidari |
| 2005/0023909 A1 | 2/2005 | Cromas |
| 2007/0200438 A1 * | 8/2007 | Kaminski et al. ............... 310/54 |
| 2007/0216236 A1 | 9/2007 | Ward |
| 2008/0168796 A1 * | 7/2008 | Masoudipour et al. ......... 62/505 |
| 2009/0267426 A1 * | 10/2009 | Graner et al. ................... 310/54 |
| 2010/0261575 A1 | 10/2010 | Schoenek |
| 2010/0283334 A1 | 11/2010 | Lemmers, Jr. et al. |
| 2011/0285222 A1 * | 11/2011 | Chamberlin et al. ........... 310/58 |

* cited by examiner

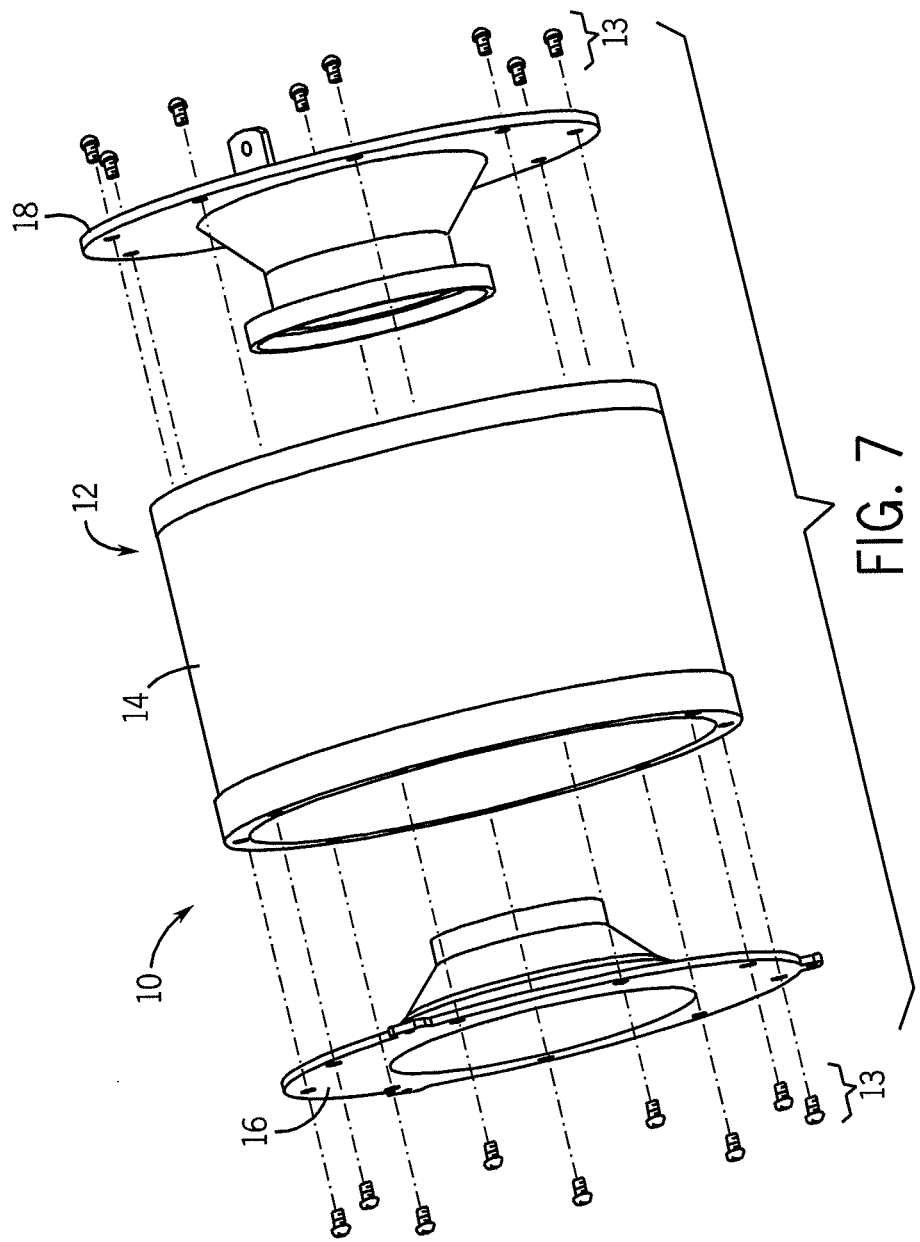

SLEEVE MEMBER FOR AN ELECTRIC MACHINE

RELATED APPLICATIONS

This application claims priority under 35 U.S.C. §119 to U.S. Provisional Patent Application No. 61/345,946 filed on May 18, 2010, the entire contents of which is incorporated herein by reference.

BACKGROUND

Some electric machines are housed within a module housing. Some module housings includes a canister with an enclosed end and an open end, and the electric machine can be positioned inside the canister through the open end. The module housing also includes a cover that can be placed over the open end of the canister to enclose the electric machine within the canister. Some methods for cooling the electric machine can include circulating a coolant around a portion of the electric machine inside of a cooling jacket. At least a portion of the cooling jacket can be defined by at least a portion of the module housing.

SUMMARY

Some embodiments of the invention provide an electric machine module including a module housing. The module housing can include a sleeve member coupled to at least one end cover and can define a machine cavity. In some embodiments, the sleeve member can include an inner perimeter and can be coupled to a stator assembly of an electric machine. In some embodiments, the electric machine can be positioned within the machine and at least partially enclosed by the module housing. In some embodiments, a coolant jacket can be defined by at least a portion of the sleeve member and at least a portion of the stator assembly.

Some embodiments of the invention provide an electric machine module including an electric machine. In some embodiments, the electric machine can include a stator assembly. In some embodiments, a sleeve member can be operatively coupled to at least a portion of the stator assembly. In some embodiments, at least a portion of the electric machine can be positioned within a module housing, which can include a canister coupled to at least one end cover. In some embodiments, the electric machine can be positioned substantially within the module housing so that at least a portion of the sleeve member is adjacent to at least a portion of the canister. In some embodiments, a coolant jacket can be defined between at least a portion of the sleeve member and at least a portion of the canister.

DESCRIPTION OF THE DRAWINGS

FIG. 7 is an exploded perspective view of an electric machine module according to one embodiment of the invention.

DETAILED DESCRIPTION

Figure 1:
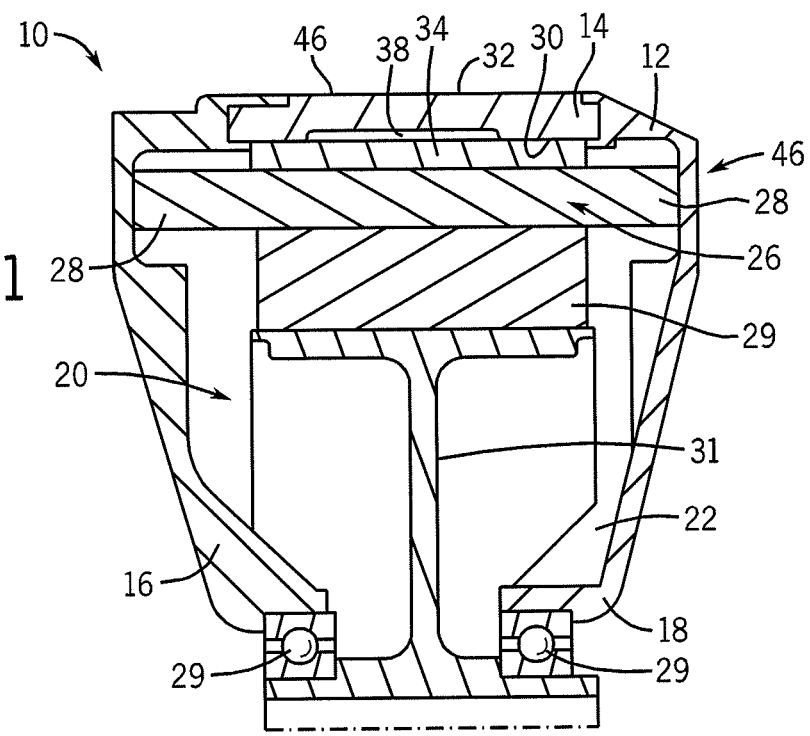
FIG. 1 is a partial cross-sectional view of an electric machine module according to one embodiment of the invention.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives that fall within the scope of embodiments of the invention.

Figure 2:
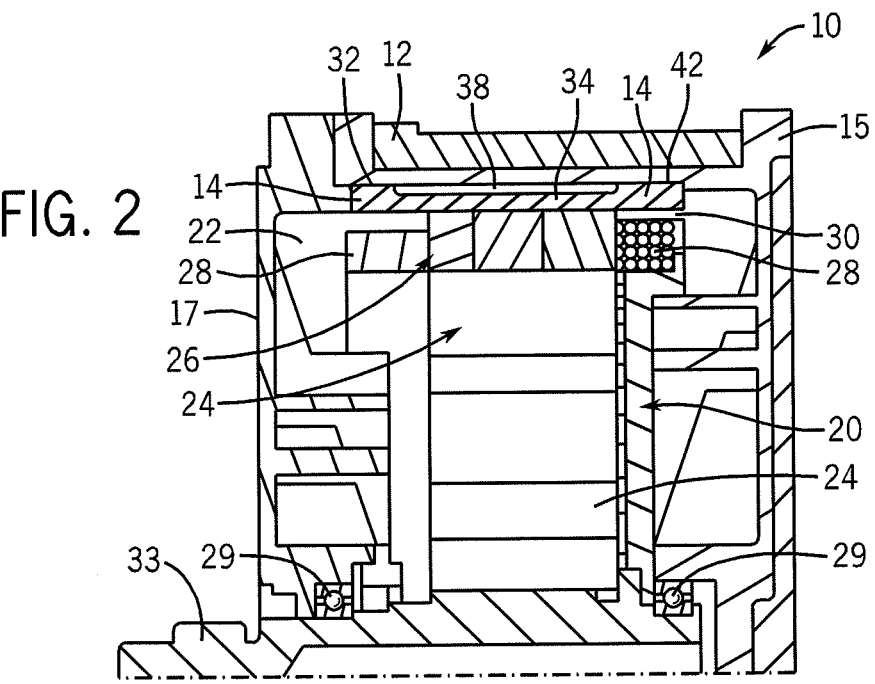
FIG. 2 is a partial cross-sectional view of an electric machine module according to another embodiment of the invention.

FIG. 1 illustrates a portion of an electric machine module 10 according to one embodiment of the invention. In some embodiments, the module 10 can include a module housing 12 comprising a sleeve member 14, a first cover 16, and a second cover 18. At least a portion of an electric machine 20 can be housed within a machine cavity 22 at least partially defined by the module housing 12. For example, the sleeve member 14 and the end caps 16, 18 can be coupled via conventional fasteners 13, or another coupling method, to enclose at least a portion of the electric machine 20 within the machine cavity 22. Moreover, in some embodiments, at least one of the end covers 16, 18 can be integral with the sleeve member 14. As discussed in further detail below, in some embodiments the module housing 12 can comprise a substantially cylindrical canister 15 and at least one end cover 17, as shown in FIG. 2. Further, in some embodiments, the module housing 12 can comprise materials that can generally include thermally conductive properties, such as, but not limited to aluminum or other metals and materials capable of generally withstanding operating temperatures of the electric machine 20. In some embodiments, the module housing 12 can be fabricated using different methods including casting, molding, extruding, and other manufacturing methods.

The electric machine 20 can include a rotor assembly 24, a stator assembly 26, including stator end turns 28, and bearings 29, and can be disposed about an output shaft 33. As shown in FIG. 1, the stator 26 can substantially circumscribe the rotor 24. In some embodiments, the rotor assembly 24 can also include a rotor hub 31 or can have a "hub-less" design, as shown in FIG. 2. In some embodiments, at least a portion of an inner diameter of the rotor assembly 24 can comprise a plurality of splines configured and arranged to matingly engage with a plurality of splines on the output shaft 34 and/or an input shaft (not shown).

The electric machine 20 can be, without limitation, an electric motor, such as a hybrid electric motor, a starter motor, an electric generator, or a vehicle alternator. In one embodiment, the electric machine 20 can be a High Voltage Hairpin (HVH) electric motor or an interior permanent magnet electric motor for hybrid vehicle applications.

Components of the electric machine 20 such as, but not limited to, the rotor assembly 24, the stator assembly 26, and the stator end turns 28 can generate heat during operation of the electric machine 20. These components can be cooled to increase the performance and the lifespan of the electric machine 20.

In some embodiments, the sleeve member 14 can comprise a substantially annular shape and can include an inner perimeter 30 and an outer perimeter 32. In some embodiments, the sleeve member 14 can comprise other shapes such as, but not limited to, elliptical, hemispherical, regular or irregular polygonal, or any combination thereof. In some embodiments, at least a portion of the sleeve member 14 can comprise a shape substantially similar to a shape of at least a portion of the stator assembly 26. In some embodiments, the sleeve member 14 can comprise stainless steel, aluminum, cast aluminum, copper, and other materials. In some embodiments, at least a portion of the sleeve member inner perimeter 30 can be operatively coupled to an outer perimeter 34 of the stator assembly 26, so that the sleeve member 14 and the stator assembly 24 are substantially retained in a position relative to one another, as shown in FIGS. 1-2 and 5-6. For example, in some embodiments, the sleeve member 14 can substantially circumscribe at least a portion of the stator assembly 26. By way of example only, in some embodiments, the stator assembly 26 and the sleeve member 14 can be friction fit, interference fit, welded, brazed, or otherwise coupled together. In some embodiments, one or more elements, such as a stator retainer 36 (as shown in FIG. 6), can provide an interface between the sleeve member 14 and the stator assembly 26 so that the stator assembly 26 can be coupled to the sleeve member 14 and at least a portion of the torque produced during electric machine operations can be transmitted between at least these components.

As shown in FIG. 1, in some embodiments, the electric machine module 10 can include a coolant jacket 38. In some embodiments, at least a portion of the sleeve member 14 and at least a portion of the outer perimeter 34 of the stator assembly 26 can at least partially define the coolant jacket 38. In some embodiments, the coolant jacket 38 can receive a coolant from a coolant source (not shown) via at least one coolant inlet (not shown). In some embodiments, the coolant jacket 38 can contain the coolant that can comprise transmission fluid, ethylene glycol, an ethylene glycol/water mixture, water, oil, motor oil, or a similar substance. In some embodiments, the coolant can comprise a gas and/or mist. For example, in some embodiments, the coolant jacket 38 can be defined between the sleeve member inner perimeter 30 and the stator assembly outer perimeter 34 and can receive the coolant from the coolant source. In some embodiments, the sleeve member inner perimeter 30 and/or the stator assembly outer perimeter 34 can comprise o-rings and/or other sealing structures (not shown) to provide sealing surfaces to substantially seal the coolant jacket 38 from other portions of the module 10. In some embodiments, the coolant jacket 38 can substantially circumscribe at least a portion of the stator assembly 26.

FIG. 2 illustrates the electric machine module 10 according to other embodiments of the invention. As shown in FIG. 2, the electric machine module 10 can comprise the sleeve member 14 and the module housing 12 can include the canister 15 and the end cover 17. In some embodiments, the canister 15 can comprise an open end and a closed end. In other embodiments, the canister 15 can comprise two substantially open ends and an additional end cover (not shown) coupled to at least one of the open ends to substantially form the canister 15. In some embodiments, the sleeve member 14 and the canister 15 can be coupled together before coupling together the sleeve member 14 and the stator assembly 26. In other embodiments, the sleeve member 14 and the canister 15 can be coupled together after and/or substantially simultaneously to the coupling together of the sleeve member 14 and the stator assembly 26. In some embodiments, the sleeve member 14 can be immediately adjacent to the canister 15 so that portions of the sleeve member 14 and the canister 15 can substantially contact each other. In some embodiments, the sleeve member 14 and the canister 15 can be coupled together so that the coolant jacket 38 can be defined between at least a portion of the sleeve member 14 and at least a portion of the canister 15. For example, in some embodiments, at least a portion of the sleeve member outer perimeter 32 and at least a portion of an inner perimeter 40 of the canister 15 can define the coolant jacket 38. In some embodiments, at least one coolant inlet (not shown) can be positioned through a portion of the canister 15 and/or end cover 17 so that coolant can be circulated through the coolant jacket 38 from a coolant source (not shown). In some embodiments, the sleeve member outer perimeter 32 and/or the canister inner perimeter 40 can comprise o-rings and/or other sealing structures (not shown) to provide sealing surfaces to substantially seal the coolant jacket 38 from other portions of the module 10. For example, in some embodiments, at least one o-ring can be positioned in at least one first groove 42 defined around at least a portion of the sleeve member outer perimeter 32, as shown in FIG. 2.

In some embodiments, as shown in FIGS. 1-5, at least one mount 44 can be located between the sleeve member 14 and an additional housing 46 (e.g., a transmission housing, a motor housing, an additional motor housing, another machine housing, etc.) or the canister 15, respectively, to substantially retain the sleeve member 14 in position and to aid in transmitting at least a portion of the torque produced during the operation of the electric machine 20. In addition, in some embodiments, o-rings or other sealing structures can be positioned in at lease one second groove 46 located substantially between at least a portion of the sleeve member outer perimeter 32 and at least a portion of the additional housing 46.

In some embodiments, different portions of the sleeve member 14 can define at least a portion of the coolant jacket 38. For example, as previously mentioned, in some embodiments, the coolant jacket 38 can be defined by at least a portion of the sleeve member perimeter 30, as shown in FIG. 1, at least a portion of the sleeve member outer perimeter 32, as shown in FIG. 2, or can be substantially internally positioned with respect to the sleeve member 14 (not shown).

As previously mentioned, in some embodiments, the stator sleeve 14, the canister 15, and/or the additional housing 46 can comprise at least one coolant inlet to allow coolant flow into the coolant jacket 38. In some embodiments, the coolant can be directed into the coolant jacket 38 and can circulate through at least a portion of the coolant jacket 38 to remove at least a portion of the heat energy produced by the electric machine 20. For example, in some embodiments, the coolant circulating through the coolant jacket 38 can remove at least a portion of the heat energy produced by the stator assembly 26 because the coolant jacket 38 can substantially circumscribe at least a portion of the stator assembly 26.

Figure 3:
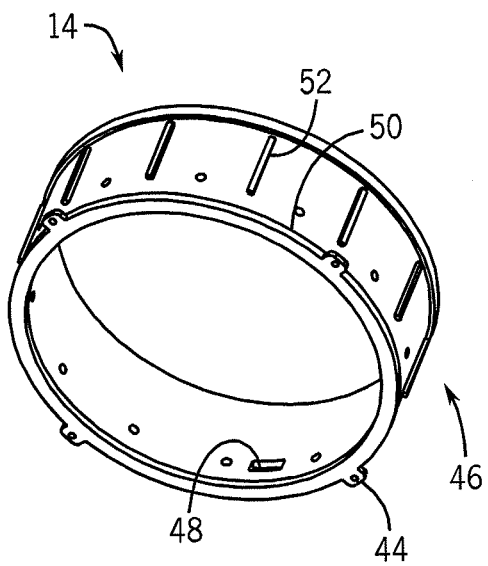
FIG. 3 is a perspective view of a stator sleeve according to one embodiment of the invention.
Figure 4:
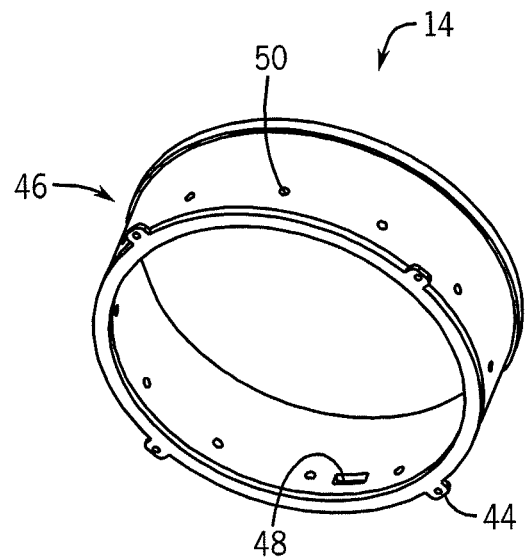
FIG. 4 is a perspective view of a stator sleeve according to another embodiment of the invention.

As shown in FIGS. 3 and 4, in some embodiments, the sleeve member 14 can comprise a plurality of coolant apertures 50 so that the coolant jacket 38 is in fluid communication with the machine cavity 22. In some embodiments, the coolant apertures 50 can be positioned substantially adjacent to the stator end turns 28 (e.g., radially outward, radially inward, axially inward, a combination thereof, etc.) so that at least a portion of the coolant circulating through the coolant jacket 38 can directed toward the stator end turns 28. In some embodiments, after exiting the coolant jacket 38 through the coolant apertures 50, at least a portion of the coolant can flow through portions of the machine cavity 22 can contact elements of the module 10 to remove at least a portion of the heat energy produced during and after electric machine operations.

Figure 5:
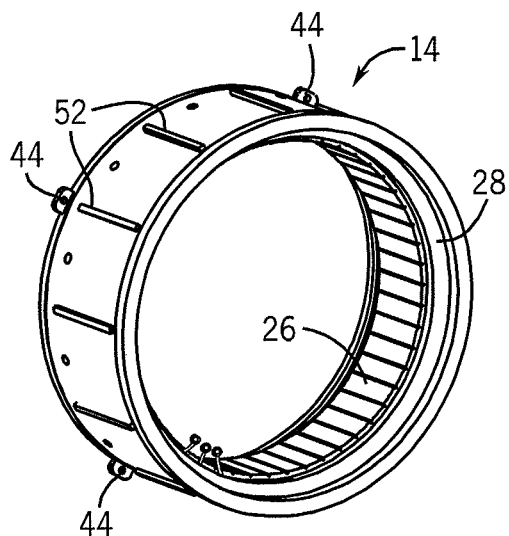
FIG. 5 is a perspective view of a stator inside the stator sleeve of FIG. 3.
Figure 6:
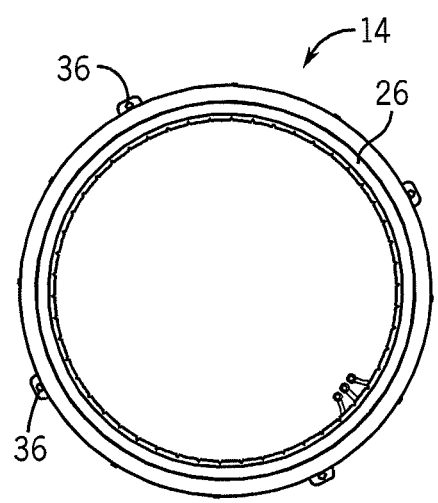
FIG. 6 is a side view of a stator inside the stator sleeve of FIG. 3.

As shown in FIGS. 3 and 5, in some embodiments, the sleeve member 14, the outer perimeter of the stator assembly 34, and/or the inner perimeter of the canister 40 can comprise at least one feature 52. Although future references to feature 52 are singular, in some embodiments, the module 10 can comprise a plurality of features 52. In some embodiments, the feature 52 can extend from the sleeve member 14, the outer perimeter of the stator assembly 34, and/or the inner perimeter of the canister 40 into the coolant jacket 38 to direct the coolant flow throughout the coolant cavity 38 in a variety of directions, creating a more turbulent flow. Also, in some embodiments, the feature 52 can provide more surface area from which heat energy can be transferred from module 10 to the coolant. In some embodiments, the feature 52 can comprise a substantially rectangular shape in a substantially axially directed orientation, and in other embodiments, the feature 52 can comprise other shapes and can be oriented in other directions (e.g., axially, radially, a combination thereof, etc.). Moreover, in some embodiments, the feature 52 can comprise a recessed shape with respect to the coolant jacket 38 (e.g., substantially radially inward and radially outward with respect to the coolant jacket 38). In some embodiments, the module 10 can comprise features 52 including a combination of shapes and sizes. As a result of more turbulent flow and increased heat transfer surface area, the coolant can make more contact with the sleeve member 14 and remove additional levels of heat form the electric machine module 10.

In some embodiments, the coolant can exit the coolant jacket 38 and/or the machine cavity 22 through a drain 48, as shown in FIGS. 3 and 4. In some embodiments, the drain 48 can be positioned through a portion of the sleeve member 14, the canister 15, or other portions of the module housing 12. In some embodiments, the drain 48 can be in fluid communication with at least one of the coolant jacket 38 and the machine cavity 22 so that at least a portion of the coolant within the machine cavity 22 and/or the coolant jacket 38 can exit the module 10. In some embodiments, the coolant can exit the module 10 through the drain 48, which can be fluidly connected to a heat exchange element (not shown). As a result, in some embodiments, at least a portion of the heat energy received by the coolant can be removed at the heat exchange element and at least a portion of the coolant can be re-circulated to the module 10.

It will be appreciated by those skilled in the art that while the invention has been described above in connection with particular embodiments and examples, the invention is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein. Various features and advantages of the invention are set forth in the following claims.

The invention claimed is:

1. An electric machine module comprising:
an electric machine including a stator assembly with stator end turns and a rotor assembly, the stator assembly circumscribing at least a portion of the rotor assembly;
a sleeve member operatively coupled to at least a portion of the stator assembly, the sleeve member substantially circumscribing at least a portion of the stator assembly, and the sleeve member including an outer perimeter;
a module housing;
Including a canister and at least one end cover, the canister being distinct from and coupled to the at least one end cover and an inner perimeter of the module housing,
at least a portion of the module housing defining a machine cavity,
the canister including an inner perimeter, and
the electric machine positioned substantially within the machine cavity so that the electric machine is at least partially enclosed by the module housing and at least a portion of the sleeve member is immediately adjacent to at least a portion of the inner perimeter of the canister; and
a coolant jacket defined by at least a portion of the outer perimeter of the sleeve member and at least a portion of the inner perimeter of the canister.

2. The electric machine module of claim 1 and further comprising a plurality of coolant apertures positioned through a portion of the sleeve member so that the coolant jacket is in fluid communication with the machine cavity.

3. The electric machine module of claim 2, wherein the plurality of coolant apertures are positioned substantially adjacent to at least a portion of the stator end turns.

4. The electric machine module of claim 1 and further comprising at least one feature.

5. The electric machine module of claim 4, wherein at least one of the outer perimeter of the sleeve member and the inner perimeter of the canister comprises the at least one feature.

6. The electric machine module of claim 1, wherein the sleeve member comprises at least one first groove.

7. The electric machine module of claim 1, wherein the sleeve member comprises at least one stator retainer.

8. The electric machine module of claim 1 and further comprising at least one drain positioned through a portion of the canister, the at least one drain in fluid communication with at least one of the coolant jacket and the machine cavity.

9. The electric machine module of claim 1, wherein the sleeve member comprises stainless steel.

* * * * *